United States Patent [19]

Welbourn et al.

[11] Patent Number: 5,371,820
[45] Date of Patent: Dec. 6, 1994

[54] OPTICAL HYBRID MOTHERBOARD INTERCONNECTION SYSTEM AND METHOD OF ASSEMBLING SAME

[75] Inventors: Anthony D. Welbourn; Michael D. Gill, both of Ipswich, England

[73] Assignee: British Telecommunications public limited company, London, England

[21] Appl. No.: 969,320

[22] PCT Filed: Jul. 2, 1991

[86] PCT No.: PCT/GB91/01073
§ 371 Date: Feb. 18, 1993
§ 102(e) Date: Feb. 18, 1993

[87] PCT Pub. No.: WO92/00538
PCT Pub. Date: Jan. 9, 1992

[30] Foreign Application Priority Data

Jul. 2, 1990 [GB] United Kingdom ............. 9014639

[51] Int. Cl.$^5$ ............................................. G02B 6/26
[52] U.S. Cl. .................................. 385/76; 385/14;
385/15; 385/33; 385/49; 385/52; 385/77;
385/88; 385/89; 385/90; 385/130; 385/132;
385/139
[58] Field of Search ............... 385/76, 77, 78, 81,
385/83, 87, 59, 65, 75, 157, 14, 15, 33, 51, 52,
58, 64, 70, 71, 72, 88, 89, 90, 91, 129, 130, 131,
132, 82, 85, 139; 372/7, 43, 50

[56] References Cited

U.S. PATENT DOCUMENTS

| | | | |
|---|---|---|---|
| 4,252,407 | 2/1981 | Bubanko et al. | 385/87 X |
| 4,279,468 | 7/1981 | Turley et al. | 385/64 X |
| 4,639,074 | 1/1987 | Murphy | 385/52 X |
| 4,802,727 | 2/1989 | Stanley | 385/52 |
| 4,943,136 | 7/1990 | Popoff | 385/46 X |
| 5,016,960 | 5/1991 | Eichen et al. | 385/45 X |
| 5,016,972 | 5/1991 | Schlaak | 385/65 X |
| 5,082,346 | 1/1992 | Myers | 385/65 X |
| 5,199,093 | 3/1993 | Longhurst | 385/49 X |
| 5,216,732 | 6/1993 | Knott | 385/64 X |

FOREIGN PATENT DOCUMENTS 0331331 9/1989 European Pat. Off. ........ 385/14 X (List continued on next page.)

OTHER PUBLICATIONS

Sixth European Conference on Optical Communication, York, 16–19 Sep. 1980, R. Jocteur et al.: "A New fiber ribbon cable," pp. 342–346.

(List continued on next page.)

Primary Examiner—Brian Healy
Attorney, Agent, or Firm—Nixon & Vanderhye

[57] ABSTRACT

An optical system comprises a hybrid optical motherboard having a plurality of optical interconnections formed therein, and a connector. A connector region is formed in, but does not extend completely along, an edge portion of the hybrid optical motherboard. The connector region contains a number of optical interconnections, and the connector contains an optical device. The connector is connectible to the connector region to align the optical device of the connector with the optical interconnections contained in the connector region. The connector and the connector region each comprises first and second substrates made of crystalline material and containing intersecting planes which can be delineated by etching. Each first substrate is formed with etched alignment grooves, and each second substrate is formed with etched alignment grooves which are complementary to the alignment grooves of the associated first substrate. The alignment grooves of the first and second substrates of the connector and of the connector region are accurately aligned and contiguous when the two substrates are placed in face-to-face engagement, and the aligned contiguous alignment grooves of the connector can be accurately provided with an alignment mechanism for accurately positioning the associated optical device between its two substrates with respect to the contiguous aligned grooves thereof.

30 Claims, 7 Drawing Sheets

FOREIGN PATENT DOCUMENTS

| | | | |
|---|---|---|---|
| 0331334 | 9/1989 | European Pat. Off. | 385/64 X |
| 2545617 | 1/1984 | France | 385/64 X |
| 2097550 | 11/1982 | United Kingdom | 385/33 X |
| 2141256 | 12/1984 | United Kingdom | 385/33 X |

OTHER PUBLICATIONS

*Patent Abstracts of Japan,* vol. 6, No. 243, 2 Dec. 1982 & JP A 57143886 (Fujitsu K.K.) 6 Sep. 1982.

*IEEE Communications Magazine,* vol. 26, No. 1, Jan. 1988 *IEEE,* Nakagami et al.: "Optical and optoelectronic devices for optical fiber transmission systems," pp. 28–33.

Peterson, "Silicon as a Mechanical", Proc. IEEE, vol. 70, No. 5, pp. 420–457, May 1982.

A. D. Trigg, *GEC Journal of Research,* vol. 7, No. 1, pp. 16–27, 1989.

H. Terui et al., *New Technologies,* vol. 1, No. 4, pp. 114–121, 1989.

M. J. Wale et al., *Plessey Research and Technology,* Sep. 1989, Gothenburg, Sweden.

E. J. Murphy, *Fiber Attachment for Guided Wave Guides,* IEEE pp. 862–871 (1988).

Proceedings of the IEEE, vol. 70, No. 5, pp. 423–425, May 1981.

OPTICAL HYBRID MOTHERBOARD INTERCONNECTION SYSTEM AND METHOD OF ASSEMBLING SAME

BACKGROUND OF THE INVENTION

1. Field of the Invention

This invention relates to an optical interconnection system, and in particular to an interconnection system for hybrid optical motherboards.

2. Related Art

Figure 13:
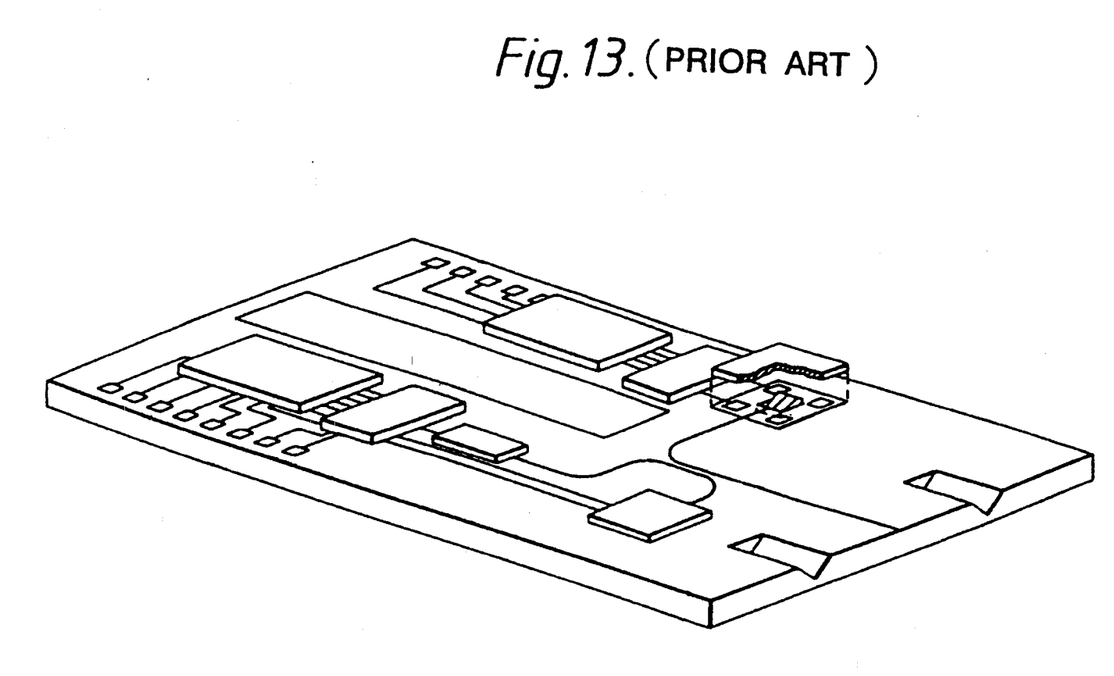
FIG. 13 is a perspective view of a known simple hybrid optical motherboard.

A hybrid optical motherboard is a motherboard including optical interconnections and other optical components, and is, therefore, the optical equivalent of a printed circuit board (pcb). Electrical interconnections for the optical components are also provided on the motherboard as appropriate. One simple example of the flexibility of hybrid optical motherboard technology is shown in FIG. 13.

Optical connectors are required to interconnect the optical interconnections of a hybrid optical motherboard and other optical components (which may form part of another hybrid optical motherboard). Such an optical connector must accurately align with optical interconnections on the motherboard, and must mate with a complementary connector region of the motherboard.

It is known to use micromachined silicon V-grooves for alignment purposes in such connector/connector region combinations. Thus, European patent specification 331334 describes a connector made from two identical silicon substrates which are held in precision alignment using two metal guiding rods which are pressed against bevelled edges of the substrates, the bevelled edges being formed by cleaving or sawing each of the substrates along the centers of the pair of micromachined V-grooves. The disadvantage of such an arrangement is that it is only possible to form a maximum of two connector regions on any one component, the connector regions being on opposite edges of the component and utilizing the same pairs of V-grooves to form the alignment means for each region.

By analogy with the electrical interconnection of pcbs, it is readily apparent that applications exist where it would be advantageous to form several optical connector regions on one optical component. A hybrid optical motherboard is one such example.

BRIEF SUMMARY OF THE INVENTION

The present invention provides an optical system comprising a hybrid optical motherboard having a optical interconnections formed therein, and a connector, a connector region being formed in, but not extending completely along, an edge portion of the hybrid optical motherboard, the connector region containing a number of optical interconnections, and the connector containing an optical device, the connector being connectible to the connector region to align the optical device of the connector with the optical interconnections contained in the connector region, wherein the connector and the connector region each comprises first and second substrates made of crystalline material and containing intersecting planes which can be delineated by etching, each first substrate being formed with etched alignment groove means, and each second substrate being formed with etched alignment groove means which are complementary to the alignment groove means of the associated first substrate, whereby the alignment groove means of the first and second substrates of each of the connector and the connector region are accurately aligned and contiguous when the two substrates are placed in face-to-face engagement, and the aligned contiguous alignment groove means of the connector can be accurately aligned, and be contiguous, with the aligned, contiguous alignment groove means of the connector region, and wherein the connector is provided with alignment means for accurately positioning the associated optical device between its two substrates with respect to the contiguous aligned groove means thereof.

In a preferred embodiment, there are a plurality of connectors, and a plurality of connector regions, each connector region being formed in, but not extending completely along, a respective edge portion of the hybrid optical motherboard, each connector region containing a number of optical interconnections, and each connector containing an optical device, each of the connectors being connectible to one of the connector regions to align the device of that connector with the optical interconnections contained in that connector region, wherein each connector and each connector region comprises first and second substrates made of crystalline material and containing intersecting planes which can be delineated by etching, each first substrate being formed with etched alignment groove means, and each second substrate being formed with etched alignment groove means which are complementary to the alignment groove means of the associated first substrate, whereby the alignment groove means of the first and second substrates of each connector and each connector region are accurately aligned and contiguous when the two substrates are placed in face-to-face engagement, and the aligned contiguous alignment groove means of a given connector can be accurately aligned, and be contiguous, with the aligned, contiguous alignment groove means of a respective connector region, and wherein each connector is provided with alignment means for accurately positioning the associated optical device between its two substrates with respect to the contiguous aligned groove means thereof.

Advantageously, the hybrid optical motherboard has four orthogonal edge portions. Preferably, there are at least three connector regions.

Conveniently, a first of the connector regions is formed in one of said orthogonal edge portions, and a second of the connector regions is formed in the same orthogonal edge portion or in an orthogonal edge portion at right-angles thereto.

It will be appreciated that the nature of the crystalline material used for the substrates of the hybrid optical motherboard means that connector regions can only be formed in edge portions of the substrates that are orthogonal to the intersecting planes thereof. In practice, this means edge portions which form a rectangle or parts of a rectangle. Formation of connector regions is not, therefore, restricted to one in each of a pair of parallel opposite edges as is the case with prior art arrangements. Thus, connector regions can be formed in adjacent orthogonal edge portions, and more than one connector region can be formed in the same edge portion. Moreover, because the or each connector region does not extend along the entire length of the associated motherboard edge portion, the motherboard edge portions have plenty of room for electrical connections as well as optical connections. This is to be contrasted with prior art arrangements in which optical connector regions take up the entire width of a motherboard.

Advantageously, each connector is formed with means for mounting the associated optical device, said mounting means constituting the alignment means of that connector. Preferably, each alignment groove means is constituted by a pair of parallel V-grooves.

The optical device of at least one of the connectors may be constituted by a one dimensional array of generally parallel optical components. Advantageously, the array of said at least one connector is mounted between, and accurately aligned with, the V-grooves of the substrates of that connector. Preferably, the components of the array of said at least one connector are optical fibres, and the mounting means of the associated substrates are constituted by a plurality of V-grooves etched into those substrates, the optical fibres being mounted in said V-grooves. Alternatively, the optical components of the array of said at least one connector are planar waveguides.

In other embodiments, the optical device of at least one of the connectors may be an ELED chip, a laser chip, a separately-formed planar waveguide component such as a lithium niobate waveguide component, or a detector chip. In the last-mentioned case, the system may further comprise a plurality of etched V-grooves formed in the first substrate of said at least one connector provided with a detector chip, the detector chip overlying said V-grooves.

Preferably, the system further comprises alignment pins positioned within the two pairs of contiguous V-grooves of each connector.

Advantageously, the hybrid optical motherboard is constituted by two substrates made of crystalline material and containing intersecting planes which can be delineated by etching, said two substrates constituting the first and second substrates of each connector region.

Conveniently, each substrate is a (100) silicon substrate.

In a preferred embodiment, at least one of the substrates of at least one of the connectors and/or at least one of the connector regions is formed with flexible portions adjacent to the alignment groove means, said flexible portions being defined by micromachined grooves or cantilevered portions. The system may further comprise an optical interface component for interfacing between a connector and a connector region, the interface component comprising first and second substrates made of crystalline material and containing intersecting planes which can be delineated by etching, the first interface component substrate being formed with etched alignment groove means, and the second interface component substrate being formed with etched alignment groove means which are complementary to the alignment groove means of the first interface component substrate, whereby the alignment groove means of the first and second interface component substrates are accurately aligned and contiguous when the two substrates are placed in face-to-face engagement, and the aligned contiguous groove means of the interface component can be aligned, and be contiguous, with the aligned, contiguous alignment groove means of a respective connector and of a respective connector region. Preferably, the optical interface component carries at least one lens, and/or at least one optical filter, and/or at least one optical isolator.

BRIEF DESCRIPTION OF THE DRAWINGS

An optical system constructed in accordance with the invention will new be described in detail, by way of example, with reference to the accompanying drawings, in which.

DETAILED DESCRIPTION OF EXEMPLARY EMBODIMENTS OF THE INVENTION

Figure 1:
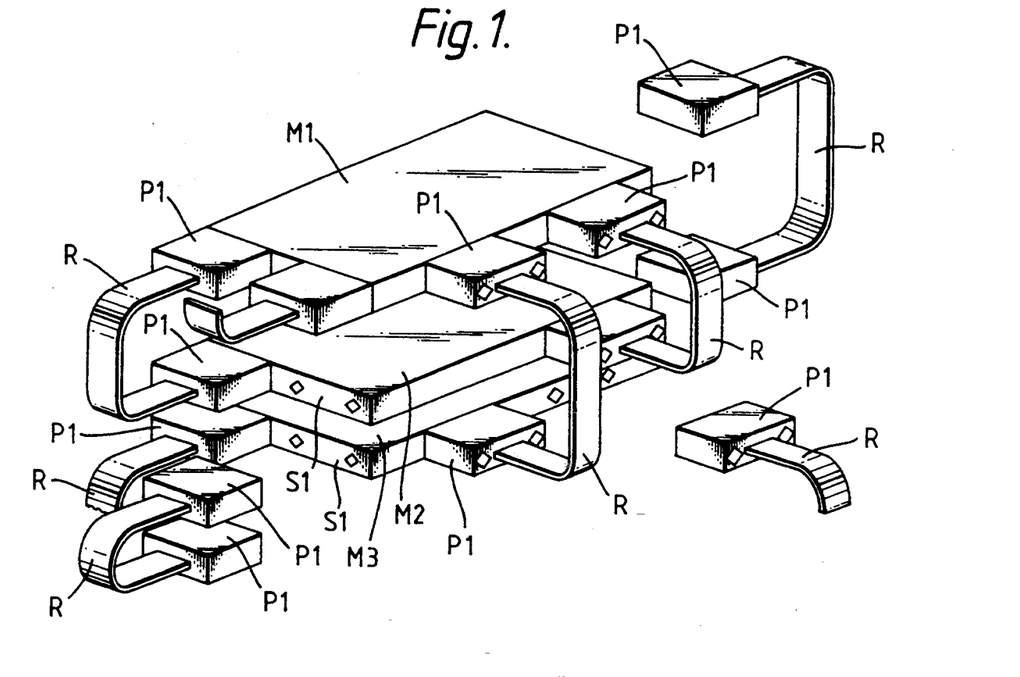
FIG. 1 is a perspective view showing three hybrid optical motherboards and optical connectors therefor.

Referring to the drawings, FIG. 1 shows three hybrid optical mother boards M1, M2 and M3, the various optical interconnections of each of which (waveguides and/or optical fibres) are optically connected (either to interconnections on another hybrid optical motherboard or to other optical devices) by fibre ribbons R and optical connectors P1. Each of the optical connectors P1 (one of which is shown in detail in FIG. 2) mates with a complementary connector region S1 (one of which is shown in FIG. 3) in a manner shown in FIG. 4.

Figure 2:
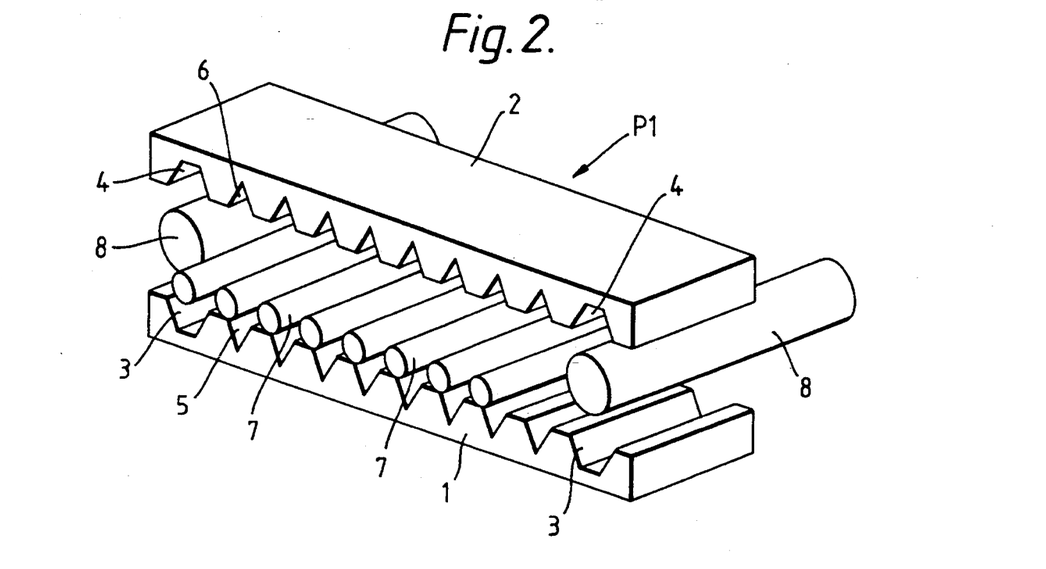
FIG. 2 is an exploded perspective view of a first form of optical connector.
Figure 3:
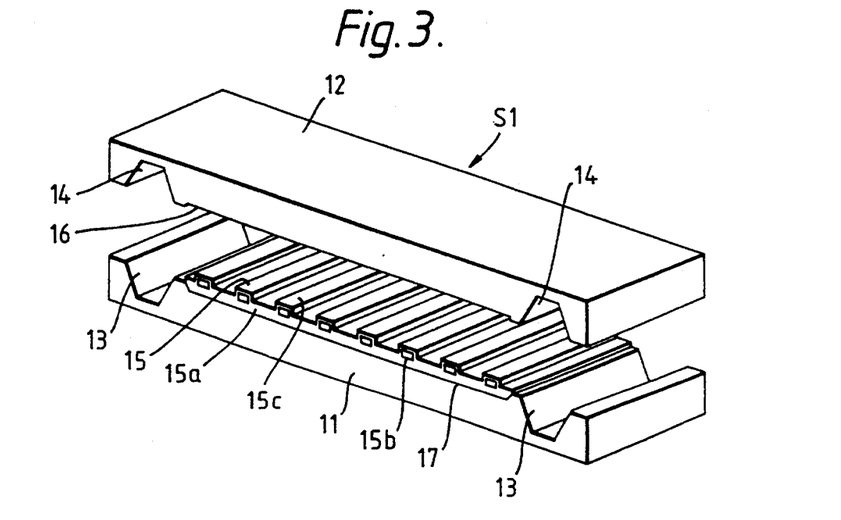
FIG. 3 is an exploded perspective view which shows schematically a connector region of one of the hybrid optical motherboards.

As shown in FIG. 2, the connector P1 includes a (100) silicon sub-mount 1 and a (100) silicon coverplate 2. The sub-mount 1 is formed with a pair of accurately-positioned V-grooves 3, and the coverplate 2 is formed with a pair of accurately-positioned V-grooves 4. The V-grooves 3 and 4 are positioned so that they are in alignment with the sub-mount 1 and the coverplate 2 of the connector P1 are placed in face-to-face engagement.

The V-grooves 3 and 4 are formed by micromachining, the V-grooves 3 and 4 being formed in the (100) silicon sub-mount 1 and the coverplate 2 by an anisotropic etching process using an etchant such as ethylene diamine pyrocatechol and water (EDP) or KOH. With such etchants, some crystal planes in silicon etch much more Slowly than others. Consequently, when a masking window is aligned correctly along the intersections of two such planes with the surface of the silicon, etching terminates at these planes, and a V-shaped groove results. Since these planes are related directly to the crystallographic structure of the silicon, the angle and direction of the V-groove are very tightly controlled. The width of such a V-groove can, therefore, be controlled very accurately, typically to a tolerance of 0.25 $\mu$m to 0.5 $\mu$m. Thus, the V-grooves 3 and 4 can be formed accurately with respect to the surfaces of the sub-mount 1 and the coverplate 2 by etching (using EDP or KOH) through masks formed with suitably positioned and dimensioned mask windows. The V-grooves 3 and 4 have flat bases which result from the etching process being limited to a predetermined etch time.

The sub-mount 1 and the coverplate 2 are also each formed with an array of eight parallel V-grooves 5 and 6 respectively. The V-grooves 5 and 6 are accurately positioned with respect to the V-grooves 3 and 4. These V-grooves 5 and 6 are formed by micromachining at the same time as the V-grooves 3 and 4. The V-grooves 5 and 6 are complete V-grooves, whereas the V-grooves 3 and 4 have flat bases. The etch time which limits the etching process so as to define the flat bases of the V-grooves 3 and 4 is sufficient to ensure that the complete V-grooves 5 and 6 are formed. The V-grooves 3, 5 and 4, 6 are positioned so as to be in alignment when the sub-mount 1 and the coverplate 2 are placed in face-to-face engagement to form the connector P1.

Prior to completing the connector P1 in this manner, a respective optical fibre 7 is positioned within each of the V-grooves 5. The connector P1 is assembled by placing precision metal pins 8 in the grooves 3 in its sub-mount 1, and using the pins to align the associated coverplate 2. The two parts and 2 are then bonded together to form the plug P1. The pins 8 are then removed to allow finishing of the connector P1. The fibres 7 are then cleaved and polished to ensure that their end faces are flush with the end face of the connector P1. The plug P1 is then completed by re-inserting the pins 8 into the aligned grooves 3 and 4.

FIG. 3 is a schematic representation of a connector region S1 of one of the hybrid optical motherboards M1, M2 and M3. The connector region S1 includes a (100) silicon submount 11 and a (100) silicon coverplate 12. Accurately aligned V-grooves 13 and 14 are formed respectively in the sub-mount 11 and the coverplate 12, the V-grooves having flat bases and being formed by micromachining in the same manner as the V-grooves 3 and 4.

The sub-mount 11 is formed with an array of eight parallel planar waveguides 15, and the coverplate 12 is formed with a recess 16 for receiving the portions of the waveguides that project beyond the upper surface of the sub-mount. The waveguides 15 are positioned in a recess 17 formed in the central portion of the sub-mount 11. The waveguides 15 are accurately positioned with respect to the V-grooves 13. The V-grooves 13 and 14 are positioned so as to be in alignment when the sub-mount 11 and the coverplate 12 are placed in face-to-face engagement to form the connector region S1, precision metal pins (not shown, but identical to the pins 8) being used to ensure this alignment. The waveguides 15 can carry out any passive optical function such as multiplexing, directional coupling, optical signal processing and channel scrambling, and so need not be in the simple, parallel configuration shown. In particular, each connector could have a different number of inputs and outputs, and the waveguides would curve, cross-over or merge, or may interconnect with any other optical device hybrid integrated onto, the motherboard.

The waveguides 15 are defined by three oxide layers 15a, 15b and 15c formed on the central portion of the silicon substrate forming the sub-mount 11. A first oxide layer 15a forms a buffer between the waveguide cores and the underlying substrate, a second (doped) oxide layer 15b forms the waveguide cores, and the third layer 15c forms an overlay. These layers 15a, 15b and 15c are not all shown in FIG. 3 in their entireties; but this figure does show the buffer layer 15a, the parts of the layer 15b that form the waveguide cores, and the layer 15c. The buffer layer 15a is formed in the recess 17, and the core layer 15b is then formed on the buffer layer. Waveguide stripes are then etched into the layer 15b, this etching step being carried out simultaneously with the opening up of the window which will later define the V-grooves 13. This ensures a minimum alignment error between the V-grooves 13 and the waveguides 15, this error being determined basically by the variations in the linewidth control during the processing combined with mask accuracy. The resulting positional control is within the range of from 0.5 $\mu$m to 1 $\mu$m. This process of self-aligning waveguides to V-grooves is described in greater detail in the specification of British patent application No. 9021944.5.

Following the alignment of the sub-mount 11 and the coverplate 12, these items are bonded together, and the pins are removed. The end faces of the waveguides 15 are then polished to ensure that they are flush with the end face of the connector region S1.

Figure 4:
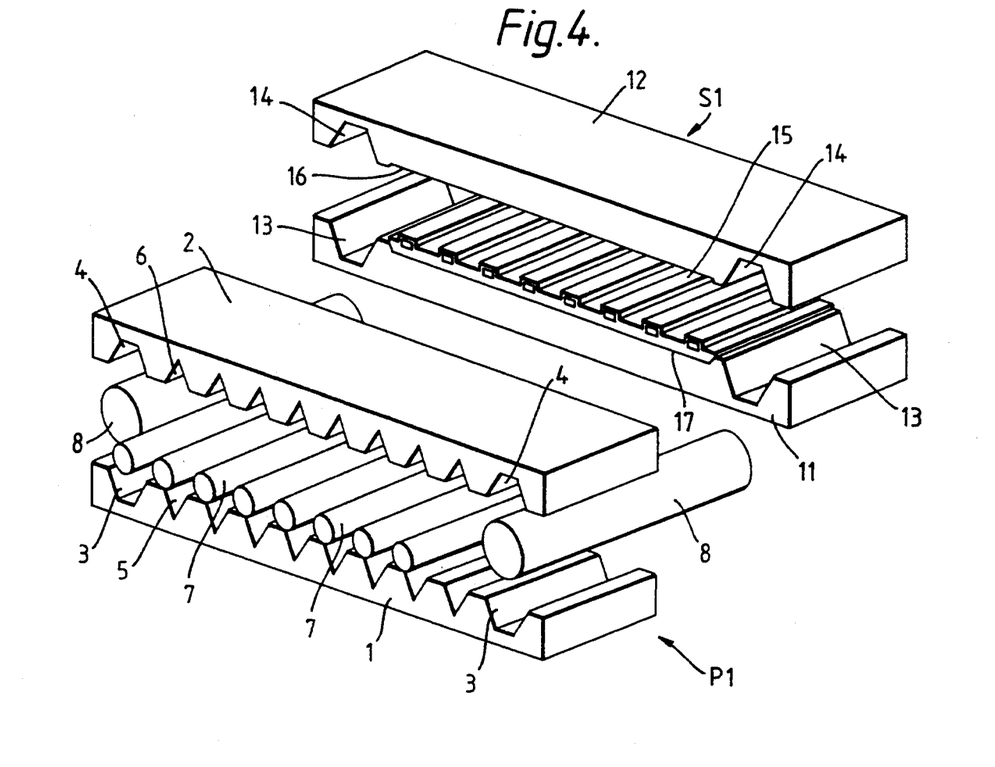
FIG. 4 is an exploded perspective view illustrating the interconnection between the connector of FIG. 2 and the connector region of FIG. 3.

The connector P1 and the connector region S1 are of complementary forms so that they can be connected together as shown in FIG. 4, thereby providing connection and accurate alignment of the optical fibres 7 and the waveguides 25. Thus, the connector P1 can be connected to the connector region S1 by inserting the pins 8 of the connector into the aligned V-grooves 13/14 of the connector region. Because the optical components associated with the connector P1 and the connector region S1 are accurately aligned with the associated V-grooves 3/4 and 13/14, these optical components will then be accurately aligned with one another. Moreover, the dimensions of the V-grooves 3, 4 and 13, 14 are controlled sufficiently to ensure that the axes of the pins 8 lie in a fixed relationship to the optical plane of the optical component(s) associated with the connector P1 and the connector region S1. Obviously, the connector P1 could be modified to carry waveguides so that waveguide-to-waveguide connection could be achieved. Similarly, fibre-to-fibre connection could be achieved by providing both the connector P1 and the connector region S1 with optical fibres.

Obviously, all the connector regions S1 of each of the motherboards M1, M2 and M3 are formed at the same time, and preferably in the same process as the interconnections themselves are formed. This means, of course, that the substrates 11 and 12 are much larger and more complex than shown in FIGS. 3 and 4.

Figure 5:
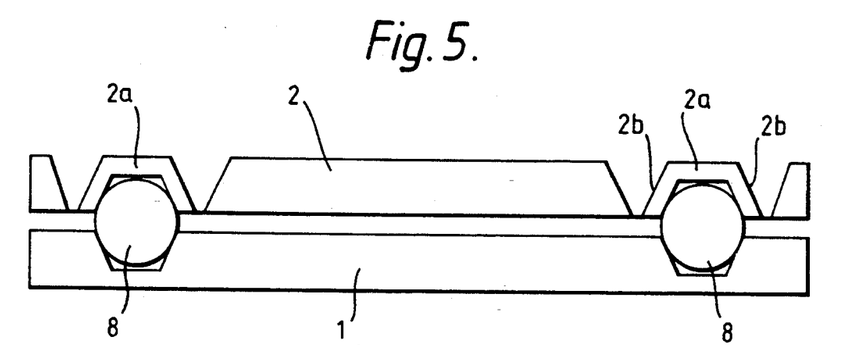
FIG. 5 is an end elevation showing a modified form of connector.

In order to facilitate removal of the precision metal pins prior to the finishing steps for either a connector P1 or a connector region S1, the associated coverplate 2 (or 12) may be formed with flexible silicon springs 2a (see FIG. 5) which are defined by grooves 2b which are micromachined into the substrate from which that coverplate 2 (or 12) is formed. The associated sub-mount 1 (or 11) could also be formed with flexible silicon springs, thereby further facilitating the removal (and possible subsequent replacement) of the pins. Appropriate design of the flexible silicon springs 2a allows the metal pins 8 to have a lower tolerance specification than would otherwise be the case.

Figure 6:
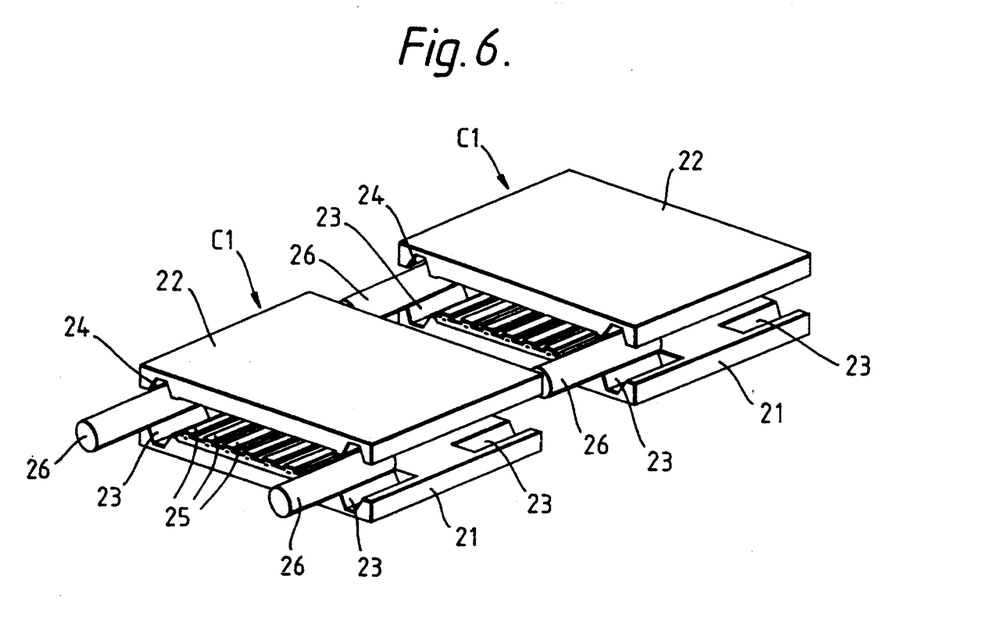
FIG. 6 is an exploded perspective view which shows schematically the interconnection between two hybrid optical motherboards.

FIG. 6 is a schematic representation showing how two hybrid optical motherboards can be connected together by means of connector regions C1 (these being the only part of the motherboards shown in FIG. 6). The connector regions C1 are modified forms of the connector regions S1. Thus, each connector region C1 has a respective (100) silicon sub-mount 21 and a respective (100) silicon coverplate 22. Pairs of accurately-aligned V-grooves 23 and 24 are formed respectively in the sub-mounts 21 and the coverplates 22, the V-grooves having flat bases and being formed by micromachining in the manner described above. Each of the sub-mounts 21 is formed with an array of eight parallel waveguides 25, these being formed in the same manner as the waveguides 15. As was the case with the waveguides 15, the waveguides 25 can carry out any passive optical function. Precision metal pins 26 are associated with one pair of aligned grooves 23/24 of each connector region C1, so that each connector region forms both a plug and a socket. The two connector regions C1 can, therefore, be connected together as shown in FIG. 6 so as to interconnect the waveguides carried by the hybrid optical motherboards in these regions.

Figure 7:
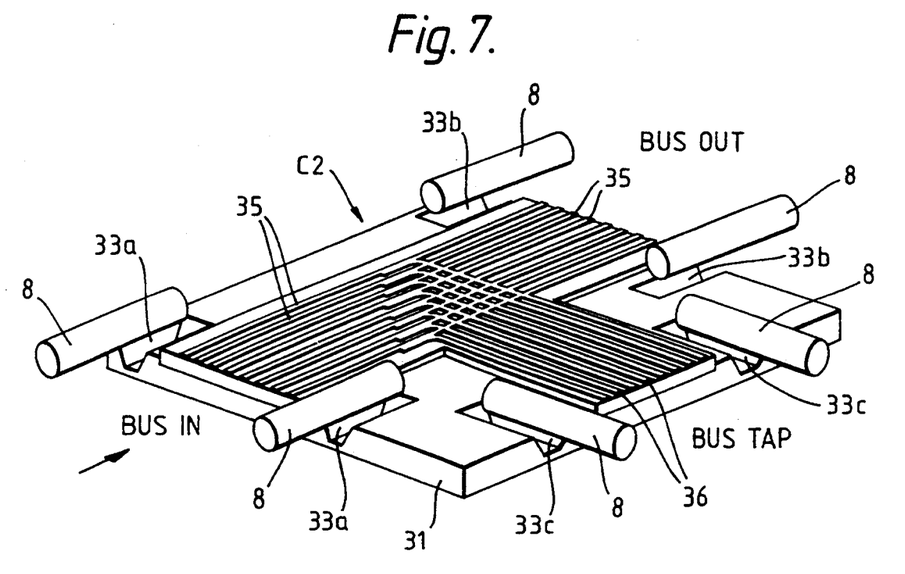
FIG. 7 is an exploded perspective view of part of one of the hybrid optical motherboards.

FIG. 7 is a schematic representation of the sub-mounts 31 of a connector region C2 of another hybrid optical motherboard which forms a tapped optical backplane. The submount 31, which is a (100) silicon sub-mount, is formed with three pairs of accurately aligned, flat-bottomed V-grooves 33a, 33b and 33c, the V-grooves being formed by micromachining in the manner described above. The V-grooves 33b are aligned with the V-grooves 33a, and the V-grooves 33c are at right-angles to both the V-grooves 33a and 33b. The sub-mount 31 is also formed with eight waveguides 35, and eight tap waveguides 36. All the waveguides 35 and 36 are formed in a similar manner to that in which the waveguides 15 are formed. The waveguides 35 are parallel and define a "bus in" in the region of the V-grooves 33a, and a "bus out" in the region of the V-grooves 33b. The waveguides 36 have straight portions terminating at the edge of the sub-mount 31 containing the V-grooves 33c, and curved portions which merge with the waveguides 35. The waveguides 36 thus define a "bus tap" in the region of the V-grooves 33c. The connector region C2 is completed by a complementary coverplate (not shown). The connector region C2 could be used to tap off light (from the "bus in") to either waveguides or fibres, via the "bus tap" and an appropriate connector P1 (only the precision metal pins 8 of which are shown), as well as feeding light directly through (from the "bus in") to either waveguides or fibres, via the "bus out" and an appropriate connector P1 (only the pins 8 of which are shown).

Figure 8:
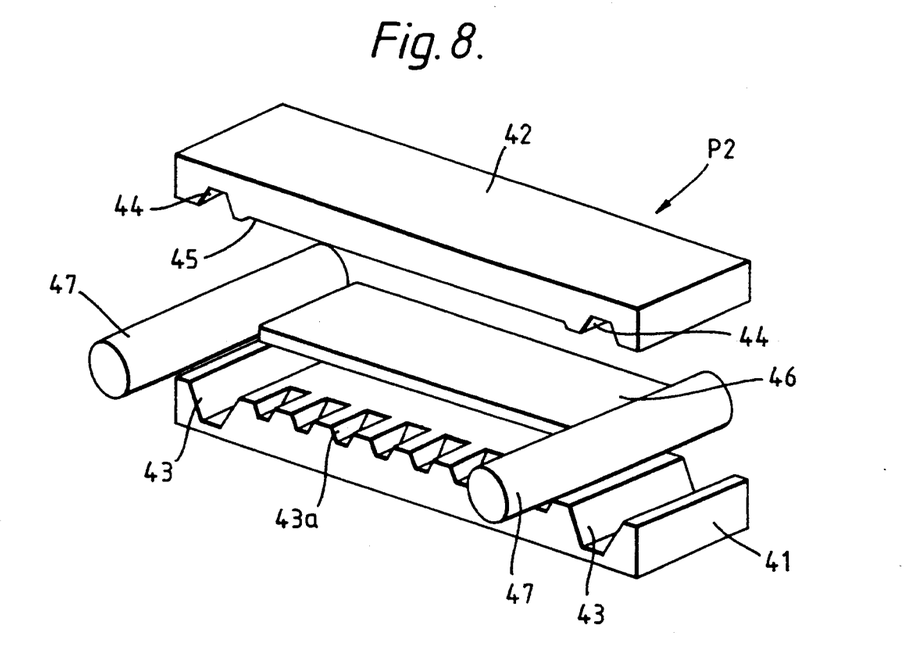
FIG. 8 is an exploded perspective view of a second form of optical connector.

FIG. 8 shows another form of optical connector P2 for connection to hybrid optical motherboards such as the motherboards M1, M2 and M3 of FIG. 1. The connector P2 has a (100) silicon sub-mount 41 and a (100) silicon coverplate 42. Accurately-aligned, flat-bottomed V-grooves 43 and 44 are formed respectively in the sub-mount 41 and in the coverplate 42, the V-grooves being formed by micromachining in the manner described above. Short, flat-bottomed V-grooves 43a are micromachined in the sub-mount 41 at the same time as the V-grooves 43 are formed. This ensures that the V-grooves 43a are accurately aligned with the V-grooves 43. A recess 45 is formed, by etching, in the coverplate 42, the recess conveniently being formed at the same time as the V-grooves 44. A detector chip 46 is positioned on the sub-mount 41 so as to overlie (see FIG. 9) the V-grooves 43a. The chip 46 is aligned with respect to the recess 45, and is bonded to the sub-mount 41 and the coverplate 42 when these two items are placed in face-to-face engagement and bonded together, precision metal pins 47 being inserted into the V-grooves 43/44 to ensure alignment of the sub-mount and the coverplate. If required, the pins 47 may be removed from the plug P2 to facilitated any essential finishing operations. They can be replaced to complete the plug P2.

Figure 9:
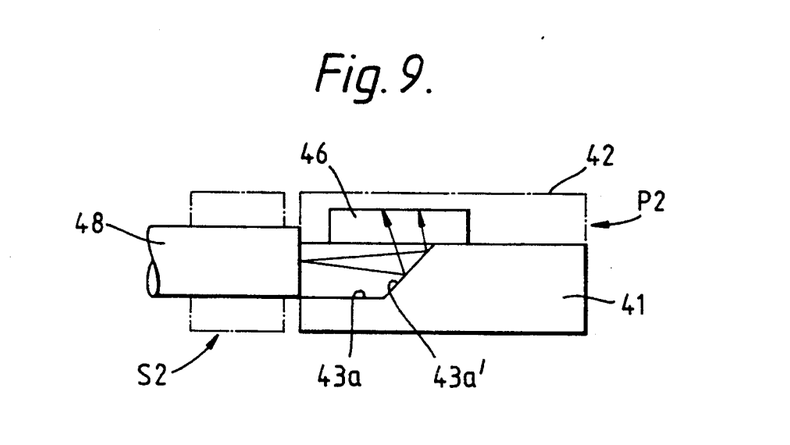
FIG. 9 is a side elevation illustrating the interconnection of the connector of FIG. 8 and a connector region of one of the hybrid optical motherboards.

As shown in FIG. 9, the plug P2 can be used with a connector region S2 (shown schematically) of one of the motherboards M1, M2 and M3, the connector region S2 having eight optical fibres 48. These fibres 48 are aligned accurately with the V-grooves 43a so that light from the fibres is reflected upwards into the detector chip 46 by the inclined end walls 43a' of the V-grooves 43. It should be noted that the micromachining process inevitably results in the formation of the inclined end walls 43a', owing to the position of the crystal planes in (100) silicon. Moreover, because of the natural properties of silicon, the etching process inevitably results in the inclined end wall 43a' defining a mirror surface.

Figure 10:
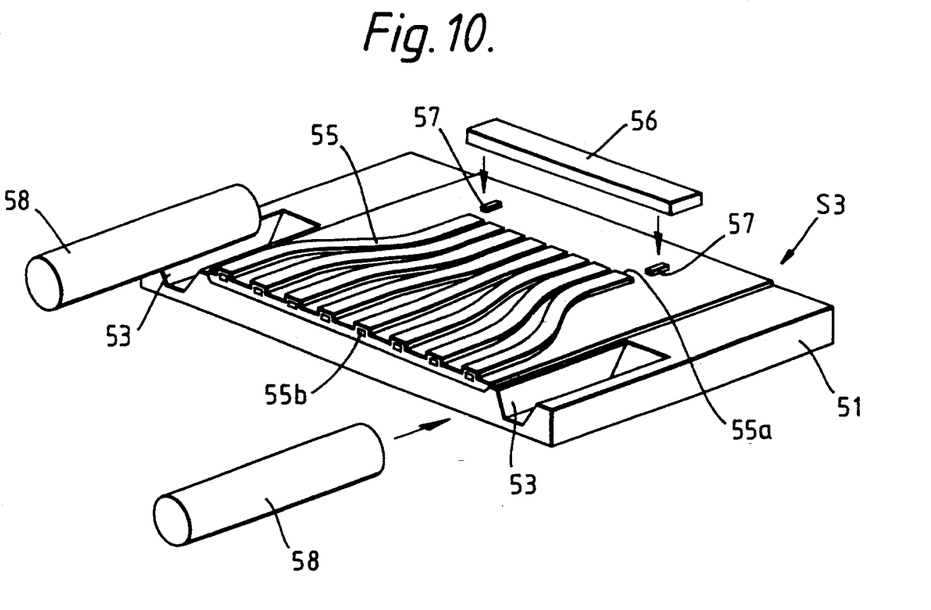
FIG. 10 is an exploded perspective view of another part of one of the hybrid optical motherboards.

FIG. 10 is a schematic representation of the sub-mount 51 of a connector region S3 of a hybrid optical motherboard such as the motherboards M1, M2 and M3 of FIG. 1. The submount 51 is a (100) silicon sub-mount provided with accurately-aligned, flat-bottomed V-grooves 53, the V-grooves being formed micromachining in the manner described above. The sub-mount 51 is also formed with an array of eight waveguides 55, the waveguides being formed in a similar manner to that in which the waveguides 15 of the embodiment of FIG. are formed. The waveguides 55 are, however, curved, so that their input ends 55a are less widely spaced than their output ends 55b. An ELED (or laser) array chip 56 is positioned in a precisely-positioned etched well (not shown) which is accurately aligned with the waveguide input ends 55a by means of a pair of locating ridges 57 formed on the sub-mount 51. The curved waveguides 55 permit matching of the spacing of the output ends 55b (which are spaced to complement the spacing of fibres in a matching connector) and the input ends 55a (which are spaced to complement the minimum convenient spacing of the ELEDs in the source array 56). In this way, wafer yield is maximized. The connector region S3 is completed by a complementary coverplate (not shown), and precision metal pins 58.

Figure 11:
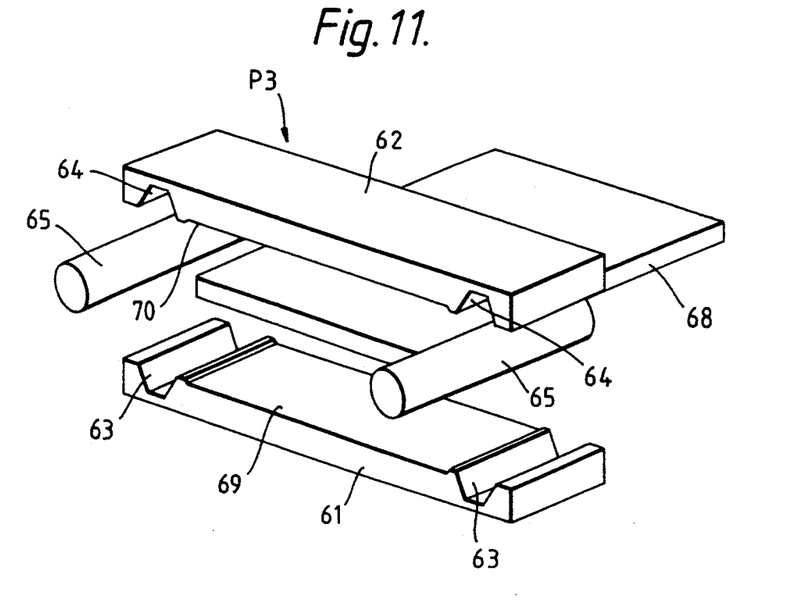
FIG. 11 is an exploded perspective view of a third form of optical connector.

FIG. 11 shows another form of optical connector P3 for connection to hybrid optical motherboards such as the motherboards M1, M2 and M3 of FIG. 1. The connector P3 has a (100) silicon sub-mount 61 and a (100) silicon coverplate 62. Accurately-aligned V-grooves 63 and 64 are formed respectively in the sub-mount 61 and in the coverplate 62, the V-grooves having flat bases and being formed by micromachining in the manner described above. Recesses 69 and 70 are formed respectively in the sub-mount 61 and in the coverplate 62. A lithium niobate waveguide component 68 is mounted in the recess 69 in the sub-mount 61. As with the earlier embodiments, precision metal pins 65 are used to ensure alignment of the sub-mount 61 and the coverplate 62 when these items are placed in face-to-face engagement to form the connector P3. The pins 65 are removable to permit finishing (polishing) of the end face of the waveguide component 68. They can then be replaced to complete the connector P3.

The waveguide component 68 is conveniently fixed within the recess 69 by flip-chip bonding, in which case the recess would contain an insulating dielectric layer and metal routing tracks and contact pads (not shown). (Flip-chip bonding is a well-known technique in which a component provided with contact pads on one surface is soldered to a substrate also provided with contact pads). Each contact pad on the component is soldered directly to a respective contact pad on the component on the substrate. By providing a sufficiently large number of contact pads, the surface tension of the molten solder pulls the component 68 into automatic alignment with fiducial marks provided on the substrate, with a submicron accuracy. In this case, the mask windows for the V-grooves 63 are defined during the metallization patterning of the contact pads within the recess 69, thereby ensuring minimal alignment error between the V-grooves and the waveguide component 68.

In making optical interconnections, it is important to control the optical properties of the interface, because roughness or dust will cause light to be scattered and the signal to be attenuated. It can be advantageous to change the optical properties using filters with a controlled wavelength transparency window. Unlike known optical connection techniques, the system of the present invention allows the interface to be controlled. The surfaces of both a connector and a connector region can be polished after removal of the metal pins, and optical coatings may be added to give low reflection or wavelength dependence of the connector. Where the optical field is of a different distribution in the two components, lenses may be readily added at the interface to improve mode matching. These lenses may be formed by any of several known techniques and attached directly to the face of the connector or connector region, or may be formed in an additional silicon component containing V-grooves matching those of the connector and connector region, and which is mounted and aligned using the same metal pins. Such a component may be additionally carry optical isolators.

Figure 12:
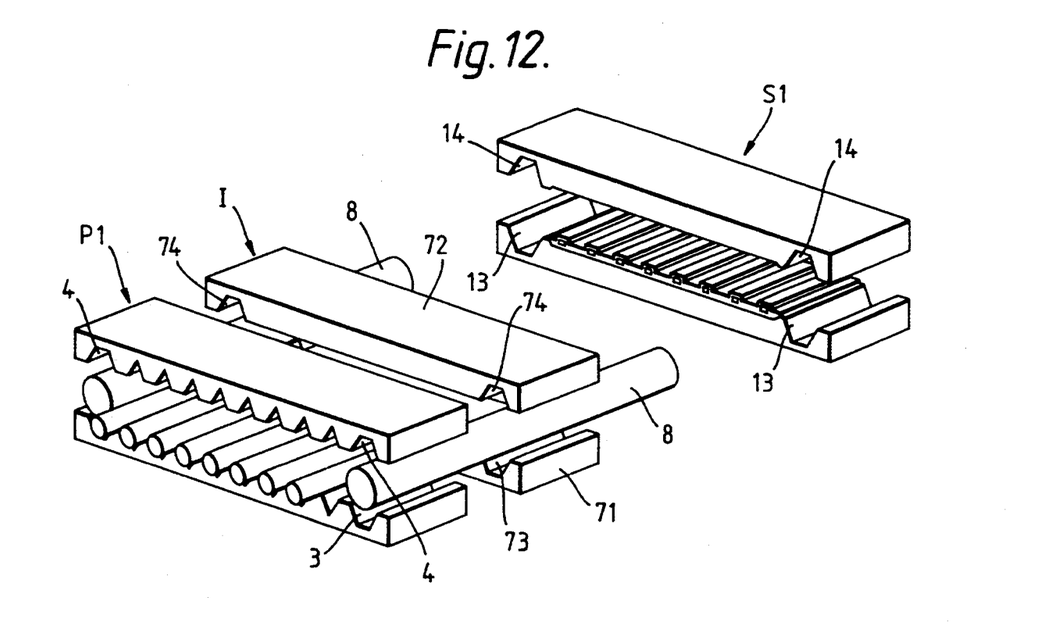
FIG. 12 is an exploded perspective view illustrating the interconnection between the connector of FIG. 2 and the connector region of FIG. 3 via an interface component.

Thus, FIG. 12 shows the interconnection of a connector P1 to a connector region S1 of a hybrid optical motherboard such as the motherboards M1, M2 and M3 of FIG. 1, via an interface component I. The interface component I is formed from a (100) silicon sub-mount 71 and a (100) silicon coverplate 72. Accurately-aligned V-grooves 73 and 74 are formed respectively in the sub-mount 73 and the coverplate 74, the V-grooves being formed by micromachining in the manner described above. The V-grooves 73, 74 are positioned so as to be in alignment with the V-grooves 3, 4 of the connector P1 and with the V-grooves 13, 14 of the connector region S1 when the components are assembled together. The pins 8 of the connector P1 are of such a length as to pass right through the aligned V-grooves 73, 74 and into the aligned V-grooves 13, 14 of the connector region S1. The interface component I is provided with lenses, optical filters, optical isolators (not shown) or any combination of these components.

It will be apparent that a number of modifications could be made to the optical connectors described above. Thus, the V-grooves 3,4 etc which are used for alignment purposes could be complete (rather than flat-bottomed) grooves where the thickness of the associated substrate 1 etc permits. Moreover, the number of optical components (such as fibres and waveguides) that can be used with optical connectors constructed in accordance with the invention is not critical, so that optical connectors having other numbers of optical components than eight are possible. It would also be possible to use other forms of electro-optic or passive waveguide components in place of the lithium niobate waveguide component. In another modification, the grooves 2b which define the flexible silicon springs 2a are cantilevered grooves.

I claim:

1. An optical system comprising:
   a hybrid optical motherboard having optical interconnections formed therein,
   a connector,
   a connector region being formed in, but not extending completely along, an edge portion of the hybrid optical motherboard, the connector region containing a number of optical interconnections,
   the connector containing an optical device and being connectible to the connector region to align the optical device of the connector with the optical interconnections contained in the connector region,
   the connector and the connector region each including first and second substrates made of crystalline material and containing intersecting planes which can be delineated by etching,
   each first substrate being formed with etched alignment groove means, and each second substrate being formed with etched alignment groove means which are complementary to the alignment groove means of the associated first substrate,
   the alignment groove means of the first and second substrates of each of the connector and the connector region being accurately aligned and contiguous when the two substrates are placed in face-to-face engagement such that the aligned contiguous alignment groove means of the connector can be accurately aligned and contiguous with the aligned, contiguous alignment groove means of the connector region, and
   the connector being provided with alignment means for accurately positioning the associated optical device between its two substrates with respect to the contiguous aligned groove means thereof.

2. An optical system as in claim 1, wherein:
   there are a plurality of connectors, and a plurality of connector regions,
   each connector region being formed in, but not extending completely along, a respective edge portion of the hybrid optical motherboard,
   each connector region containing a number of optical interconnections,
   each connector containing an optical device,
   each of the connectors being connectible to one of the connector regions to align the device of that connector with the optical interconnections contained in that connector region,
   each connector and each connector region including first and second substrates made of crystalline material and containing intersecting planes which can be delineated by etching, each first substrate being formed with etched alignment groove means, and each second substrate being formed with etched alignment groove means which are complementary to the alignment groove means of the associated first substrate, the alignment groove means of the first and second substrates of each connector and each connector region being accurately aligned and contiguous when the two substrates are placed in face-to-face engagement such that the aligned contiguous alignment groove means of a given connector can be accurately aligned and contiguous with the aligned, contiguous alignment groove means of a respective connector region, and each connector being provided with alignment means for accurately positioning the associated optical device between its two substrates with respect to the contiguous aligned groove means thereof.

3. A system as claimed in claim 2, wherein the hybrid optical motherboard has four orthogonal edge portions.

4. An optical system comprising:

a hybrid optical motherboard having optical interconnections formed therein, a connector, a connector region being formed in, but not extending completely along, an edge portion of the hybrid optical motherboard, the connector region containing a number of optical interconnections, the connector containing an optical device and being connectible to the connector region to align the optical device of the connector with the optical interconnections contained in the connector region, the connector and the connector region each including first and second substrates made of crystalline material and containing intersecting planes which can be delineated by etching, each first substrate being formed with etched alignment groove means, and each second substrate being formed with etched alignment groove means which are complementary to the alignment groove means of the associated first substrate, the alignment groove means of the first and second substrates of each of the connector and the connector region being accurately aligned and contiguous when the two substrates are placed in face-to-face engagement such that the aligned contiguous alignment groove means of the connector can be accurately aligned and contiguous with the aligned, contiguous alignment groove means of the connector region, the connector being provided with alignment means for accurately positioning the associated optical device between its two substrates with respect to the contiguous aligned groove means thereof, wherein there are a plurality of connectors, and a plurality of connector regions, each connector region being formed in, but not extending completely along, a respective edge portion of the hybrid optical motherboard, each connector region containing a number of optical interconnections, each connector containing an optical device, each of the connectors being connectible to one of the connector regions to align the device of that connector with the optical interconnections contained in that connector region, each connector and each connector region including first and second substrates made of crystalline material and containing intersecting planes which can be delineated by etching, each first substrate being formed with etched alignment groove means, and each second substrate being formed with etched alignment groove means which are complementary to the alignment groove means of the associated first substrate, the alignment groove means of the first and second substrates of each connector and each connector region being accurately aligned and contiguous when the two substrates are placed in face-to-face engagement such that the aligned contiguous alignment groove means of a given connector can be accurately aligned and contiguous with the aligned, contiguous alignment groove means of a respective connector region, each connector being provided with alignment means for accurately positioning the associated optical device between its two substrates with respect to the contiguous aligned groove means thereof, and wherein there are at least three connector regions.

5. An optical system comprising:

a hybrid optical motherboard having optical interconnections formed therein, a connector, a connector region being formed in, but not extending completely along, an edge portion of the hybrid optical motherboard, the connector region containing a number of optical interconnections, the connector containing an optical device and being connectible to the connector region to align the optical device of the connector with the optical interconnections contained in the connector region, the connector and the connector region each including first and second substrates made of crystalline material and containing intersecting planes which can be delineated by etching, each first substrate being formed with etched alignment groove means, and each second substrate being formed with etched alignment groove means which are complementary to the alignment groove means of the associated first substrate, the alignment groove means of the first and second substrates of each of the connector and the connector region being accurately aligned and contiguous when the two substrates are placed in face-to-face engagement such that the aligned contiguous alignment groove means of the connector can be accurately aligned and contiguous with the aligned, contiguous alignment groove means of the connector region, the connector being provided with alignment means for accurately positioning the associated optical device between its two substrates with respect to the contiguous aligned groove means thereof, wherein there are a plurality of connectors, and a plurality of connector regions, each connector region being formed in, but not extending completely along, a respective edge portion of the hybrid optical motherboard, each connector region containing a number of optical interconnections, each connector containing an optical device, each of the connectors being connectible to one of the connector regions to align the device of that connector with the optical interconnections contained in that connector region, each connector and each connector region including first and second substrates made of crystalline material and containing intersecting planes which can be delineated by etching, each first substrate being formed with etched alignment groove means, and each second substrate being formed with etched alignment groove means which are complementary to the alignment groove means of the associated first substrate, the alignment groove means of the first and second substrates of each connector and each connector region being accurately aligned and contiguous when the two substrates are placed in face-to-face engagement such that the aligned contiguous alignment groove means of a given connector can be accurately aligned and contiguous with the aligned, contiguous alignment groove means of a respective connector region, each connector being provided with alignment means for accurately positioning the associated optical device between its two substrates with respect to the contiguous aligned groove means thereof, wherein the hybrid optical motherboard has four orthogonal edge portions; and wherein a first of the connector regions is formed in one of said orthogonal edge portions, and a second of the connector regions is formed in the same orthogonal edge portion or in an orthogonal edge portion at right-angles thereto.

6. A system as claimed in claim 2, wherein each substrate of each connector is formed with means for mounting the associated optical device, said mounting means constituting the alignment means of that connector.

7. A system as claimed in claim 1, wherein each aligned groove means is constituted by a pair of parallel V-grooves.

8. An optical system comprising:
a hybrid optical motherboard having optical interconnections formed therein,
a connector;
a connector region being formed in, but not extending completely along, an edge portion of the hybrid optical motherboard, the connector region containing a number of optical interconnections,
the connector containing an optical device and being connectible to the connector region to align the optical device of the connector with the optical interconnections contained in the connector region,
the connector and the connector region each including first and second substrates made of crystalline material and containing intersecting planes which can be delineated by etching,
each first substrate being formed with etched alignment groove means, and each second substrate being formed with etched alignment groove means which are complementary to the alignment groove means of the associated first substrate,
the alignment groove means of the first and second substrates of each of the connector and the connector region being accurately aligned and contiguous when the two substrates are placed in face-to-face engagement such that the aligned contiguous alignment groove means of the connector can be accurately aligned and contiguous with the aligned, contiguous alignment groove means of the connector region,
the connector being provided with alignment means for accurately positioning the associated optical device between its two substrates with respect to the contiguous aligned groove means thereof, and
wherein the optical device of at least one of the connectors is constituted by a one-dimensional array of generally parallel optical components.

9. A system as claimed in claim 8, wherein the array of said at least one connector is mounted between, and accurately aligned with, the V-grooves of the substrates of that connector.

10. A system as claimed in claim 9, wherein the optical components of the array of said at least one connector are optical fibres, and the mounting means of the associated substrates are constituted by a plurality of V-grooves etched into those substrates, the optical fibres being mounted in said V-grooves.

11. A system as claimed in claim 8, wherein the optical components of the array of said at least one connector are planar waveguides.

12. An optical system comprising:
a hybrid optical motherboard having optical interconnections formed therein,
a connector;
a connector region being formed in, but not extending completely along, an edge portion of the hybrid optical motherboard, the connector region containing a number of optical interconnections,
the connector containing an optical device and being connectible to the connector region to align the optical device of the connector with the optical interconnections contained in the connector region,
the connector and the connector region each including first and second substrates made of crystalline material and containing intersecting planes which can be delineated by etching,
each first substrate being formed with etched alignment groove means, and each second substrate being formed with etched alignment groove means which are complementary to the alignment groove means of the associated first substrate,
the alignment groove means of the first and second substrates of each of the connector and the connector region being accurately aligned and contiguous when the two substrates are placed in face-to-face engagement such that the aligned contiguous alignment groove means of the connector can be accurately aligned and contiguous with the aligned, contiguous alignment groove means of the connector region,
the connector being provided with alignment means for accurately positioning the associated optical device between its two substrates with respect to the contiguous aligned groove means thereof, and
wherein the optical device of at least one of the connectors is an ELED chip.

13. An optical system comprising:
a hybrid optical motherboard having optical interconnections formed therein,
a connector;
a connector region being formed in, but not extending completely along, an edge portion of the hybrid optical motherboard, the connector region containing a number of optical interconnections, the connector containing an optical device and being connectible to the connector region to align the optical device of the connector with the optical interconnections contained in the connector region, the connector and the connector region each including first and second substrates made of crystalline material and containing intersecting planes which can be delineated by etching, each first substrate being formed with etched alignment groove means, and each second substrate being formed with etched alignment groove means which are complementary to the alignment groove means of the associated first substrate, the alignment groove means of the first and second substrates of each of the connector and the connector region being accurately aligned and contiguous when the two substrates are placed in face-to-face engagement such that the aligned contiguous alignment groove means of the connector can be accurately aligned and contiguous with the aligned, contiguous alignment groove means of the connector region, the connector being provided with alignment means for accurately positioning the associated optical device between its two substrates with respect to the contiguous aligned groove means thereof, and wherein the optical device of at least one of the connectors is a laser chip.

14. An optical system comprising:
a hybrid optical motherboard having optical interconnections formed therein,
a connector,
a connector region being formed in, but not extending completely along, an edge portion of the hybrid optical motherboard, the connector region containing a number of optical interconnections,
the connector containing an optical device and being connectible to the connector region to align the optical device of the connector with the optical interconnections contained in he connector region,
the connector and the connector region each including first and second substrates made of crystalline material and containing intersecting planes which can be delineated by etching,
each first substrate being formed with etched alignment groove means, and each second substrate being formed with etched alignment groove means which are complementary to the alignment groove means of the associated first substrate,
the alignment groove means of the first and second substrates of each of the connector and the connector region being accurately aligned and contiguous when the two substrates are placed in face-to-face engagement such that the aligned contiguous alignment groove means of the connector can be accurately aligned and contiguous with the aligned, contiguous alignment groove means of the connector region,
the connector being provided with alignment means for accurately positioning the associated optical device between its two substrates with respect to the contiguous aligned groove means thereof, and
wherein the optical device of at least one of the connectors is a separately-formed planar waveguide component.

15. A system as claimed in claim 14, wherein said optical device is a lithium niobate waveguide component.

16. An optical system comprising:
a hybrid optical motherboard having optical interconnections formed therein,
a connector,
a connector region being formed in, but not extending completely along, an edge portion of the hybrid optical motherboard, the connector region containing a number of optical interconnections,
the connector containing an optical device and being connectible to the connector region to align the optical device of the connector with the optical interconnections contained in the connector region,
the connector and the connector region each including first and second substrates made of crystalline material and containing intersecting planes which can be delineated by etching,
each first substrate being formed with etched alignment groove means, and each second substrate being formed with etched alignment groove means which are complementary to the alignment groove means of the associated first substrate,
the alignment groove means of the first and second substrates of each of the connector and the connector region being accurately aligned and contiguous when the two substrates are placed in face-to-face engagement such that the aligned contiguous alignment groove means of the connector can be accurately aligned and contiguous with the aligned, contiguous alignment groove means of the connector region,
the connector being provided with alignment means for accurately positioning the associated optical device between its two substrates with respect to the contiguous aligned groove means thereof, and
wherein the optical device of at least one of the connectors is a detector chip.

17. A system as claimed in claim 16, further comprising a plurality of etched V-grooves formed in the first substrate of said at least one connector provided with a detector chip, the detector chip overlying said V-grooves.

18. An optical system comprising:
a hybrid optical motherboard having optical interconnections formed therein,
a connector,
a connector region being formed in, but not extending completely along, an edge portion of the hybrid optical motherboard, the connector region containing a number of optical interconnections,
the connector containing an optical device and being connectible to the connector region to align the optical device of the connector with the optical interconnections contained in the connector region,
the connector and the connector region each including first and second substrates made of crystalline material and containing intersecting planes which can be delineated by etching,
each first substrate being formed with etched alignment groove means, and each second substrate being formed with etched alignment groove means which are complementary to the alignment groove means of the associated first substrate, the alignment groove means of the first and second substrates of each of the connector and the connector region being accurately aligned and contiguous when the two substrates are placed in face-to-face engagement such that the aligned contiguous alignment groove means of the connector can be accurately aligned and contiguous with the aligned, contiguous alignment groove means of the connector region, the connector being provided with alignment means for accurately positioning the associated optical device between its two substrates with respect to the contiguous aligned groove means thereof, wherein each aligned groove means is constituted by a pair of parallel V-grooves; and further comprising alignment pins positioned within the two pairs of contiguous V-grooves of each connector.

19. An optical system comprising:

a hybrid optical motherboard having optical interconnections formed therein, a connector, a connector region being formed in, but not extending completely along, an edge portion of the hybrid optical motherboard, the connector region containing a number of optical interconnections, the connector containing an optical device and being connectible to the connector region to align the optical device of the connector with the optical interconnections contained in the connector region, the connector and the connector region each including first and second substrates made of crystalline material and containing intersecting planes which can be delineated by etching, each first substrate being formed with etched alignment groove means, and each second substrate being formed with etched alignment groove means which are complementary to the alignment groove means of the associated first substrate, the alignment groove means of the first and second substrates of each of the connector and the connector region being accurately aligned and contiguous when the two substrates are placed in face-to-face engagement such that the aligned contiguous alignment groove means of the connector can be accurately aligned and contiguous with the aligned, contiguous alignment groove means of the connector region, the connector being provided with alignment means for accurately positioning the associated optical device between its two substrates with respect to the contiguous aligned groove means thereof, and wherein the hybrid optical motherboard is constituted by two substrates made of crystalline material and containing intersecting planes which can be delineated by etching, said two substrates constituting the first and second substrates of the or each connector region.

20. An optical system comprising:

a hybrid optical motherboard having optical interconnections formed therein, a connector, a connector region being formed in, but not extending completely along, an edge portion of the hybrid optical motherboard, the connector region containing a number of optical interconnections, the connector containing an optical device and being connectible to the connector region to align the optical device of the connector with the optical interconnections contained in the connector region, the connector and the connector region each including first and second substrates made of crystalline material and containing intersecting planes which can be delineated by etching, each first substrate being formed with etched alignment groove means, and each second substrate being formed with etched alignment groove means which are complementary to the alignment groove means of the associated first substrate, the alignment groove means of the first and second substrates of each of the connector and the connector region being accurately aligned and contiguous when the two substrates are placed in face-to-face engagement such that the aligned contiguous alignment groove means of the connector can be accurately aligned and contiguous with the aligned, contiguous alignment groove means of the connector region, the connector being provided with alignment means for accurately positioning the associated optical device between its two substrates with respect to the contiguous aligned groove means thereof, and wherein each substrate is a (100) silicon substrate.

21. An optical system comprising:

a hybrid optical motherboard having optical interconnections formed therein, a connector, a connector region being formed in, but not extending completely along, an edge portion of the hybrid optical motherboard, the connector region containing a number of optical interconnections, the connector containing an optical device and being connectible to the connector region to align the optical device of the connector with the optical interconnections contained in the connector region, the connector and the connector region each including first and second substrates made of crystalline material and containing intersecting planes which can be delineated by etching, each first substrate being formed with etched alignment groove means, and each second substrate being formed with etched alignment groove means which are complementary to the alignment groove means of the associated first substrate, the alignment groove means of the first and second substrates of each of the connector and the connector region being accurately aligned and contiguous when the two substrates are placed in face-to-face engagement such that the aligned contiguous alignment groove means of the connector can be accurately aligned and contiguous with the aligned, contiguous alignment groove means of the connector region, the connector being provided with alignment means for accurately positioning the associated optical device between its two substrates with respect to the contiguous aligned groove means thereof, and wherein at least one of the substrates of at least one of the connectors and/or at least one of the connector regions is formed with flexible portions adjacent to the alignment groove means, said flexible portions being defined by micromachined grooves or cantilevered portions.

22. An optical system comprising:
a hybrid optical motherboard having optical interconnections formed therein,
a connector,
a connector region being formed in, but not extending completely along, an edge portion of the hybrid optical motherboard, the connector region containing a number of optical interconnections,
the connector containing an optical device and being connectible to the connector region to align the optical device of the connector with the optical interconnections contained in the connector region,
the connector and the connector region each including first and second substrates made of crystalline material and containing intersecting planes which can be delineated by etching,
each first substrate being formed with etched alignment groove means, and each second substrate being formed with etched alignment groove means which are complementary to the alignment groove means of the associated first substrate,
the alignment groove means of the first and second substrates of each of the connector and the connector region being accurately aligned and contiguous when the two substrates are placed in face-to-face engagement such that the aligned contiguous alignment groove means of the connector can be accurately aligned and contiguous with the aligned, contiguous alignment groove means of the connector region,
the connector being provided with alignment means for accurately positioning the associated optical device between its two substrates with respect to the contiguous aligned groove means thereof, and
further comprising an optical interface component for interfacing between a connector and a connector region, the interface component comprising first and second substrates made of crystalline material and containing intersecting planes which can be delineated by etching, the first interface component substrate being formed with etched alignment groove means, and the second interface component substrate being formed with etched alignment groove means which are complementary to the alignment groove means of the first interface component substrate, whereby the alignment groove means of the first and second interface component substrates are accurately aligned and contiguous when the two substrates are placed in face-to-face engagement, and the aligned contiguous groove means of the interface component can be aligned and be contiguous, with the aligned, contiguous alignment groove means of a respective connector and of a respective connector region.

23. A system as claimed in claim 22, wherein the optical interface component carries at least one lens, and/or at least one optical filter, and/or at least one optical isolator.

24. An optical system according to claim 1 wherein the first and second substrate of the connector have ends which lie in a common plane for abutting the connector region.

25. An optical signal connection sub-system comprising:
a first crystalline substrate having a first pair of spaced-apart parallel alignment grooves etched therein in alignment with the substrate crystallography;
a second crystalline substrate having a second pair of spaced-apart parallel alignment grooves etched therein in alignment with the substrate crystallography, said first and second pairs of grooves being equally spaced-apart;
said first and second substrates being sandwiched together so that said first and second pairs of alignment grooves overlie each other to collectively form a pair of spaced-apart cavities for receiving alignment pins;
a plurality of optical devices arrayed between said pair of substrates at predetermined respective locations with respect to said alignment grooves; and
said optical devices and said pair of substrates having a common coplanar surface for mating connection to a similar optical signal connection sub-system.

26. An optical signal connection sub-system as in claim 25 further comprising:
a pair of alignment pins respectively and removably fitted into said pair of alignment cavities and protruding from said common coplanar surface for mating insertion into a similar pair of alignment cavities in a similar optical signal connection sub-system.

27. An optical signal connection system comprising a pair of optical signal connection sub-systems as in claim 25 having:
a pair of alignment pins respectively fitted into mated pairs of said alignment cavities through the mated common coplanar surfaces of said connection sub-systems.

28. An optical signal connection sub-system as in claim 25 wherein said plurality of optical devices comprise optical fibres disposed in parallel grooves also etched into at least one of said substrates in alignment with the substrate crystallography and located between said alignment grooves.

29. An optical signal connection sub-system as in claim 25 wherein said plurality of optical devices comprise optical waveguides integrally formed in at least one of said substrates and located between said alignment grooves.

30. A method of assembling an optical system comprising a hybrid optical motherboard having a optical interconnections formed therein, and a connector, a connector region being formed in an edge portion of the hybrid optical motherboard, the connector region containing a number of optical interconnections, and the connector containing an optical device, the connector being connectible to the connector region to align the optical device of the connector with the optical interconnections contained in the connector region, wherein the connector and the connector region each comprises first and second substrates made of crystalline material and containing intersecting planes which can be delineated by etching, each first substrate being formed with etched alignment groove means, and each second substrate being formed with etched alignment groove means which are complementary to the alignment groove means of the associated first substrate, whereby the alignment groove means of the first and second substrates of each of the connector and the connector region are accurately aligned and contiguous when the two substrates are placed in face-to-face engagement, and the aligned contiguous alignment groove means of the connector can be accurately aligned, and be contiguous, with the aligned, contiguous alignment groove means of the connector region when the connector and the connector region are held with their ends in mutual abutment, and wherein the connector is provided with alignment means for accurately positioning the associated optical device between its two substrates with respect to the contiguous aligned groove means thereof, the method comprising the steps of:

a) inserting pin means into the alignment groove means of the connector whereby to align the first and second substrates thereof;
b) inserting pin means into the alignment groove means of the connector region whereby to align the first and second substrates thereof;
c) removing the pin means from the alignment groove means;
d) polishing the ends of the connector and the connector region; and
e) inserting pin means in the alignment groove means of the connector and connector regions, after said polishing, for aligning said connector and connector regions.

* * * * *